United States Patent
Nomoto et al.

(10) Patent No.: US 10,613,253 B2
(45) Date of Patent: Apr. 7, 2020

(54) METASURFACE

(71) Applicant: HAMAMATSU PHOTONICS K.K., Hamamatsu-shi, Shizuoka (JP)

(72) Inventors: Yoshiro Nomoto, Hamamatsu (JP); Yoshitaka Kurosaka, Hamamatsu (JP); Kazuyoshi Hirose, Hamamatsu (JP); Takahiro Sugiyama, Hamamatsu (JP); Soh Uenoyama, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 380 days.

(21) Appl. No.: 15/701,918

(22) Filed: Sep. 12, 2017

(65) Prior Publication Data

US 2018/0074227 A1 Mar. 15, 2018

(30) Foreign Application Priority Data

Sep. 14, 2016 (JP) .................................. 2016-179427

(51) Int. Cl.
   *G02B 1/00* (2006.01)
   *G02F 1/19* (2019.01)
   *G02B 5/00* (2006.01)

(52) U.S. Cl.
   CPC ............... *G02B 1/002* (2013.01); *G02F 1/19* (2013.01); *G02B 5/008* (2013.01); *G02F 2202/101* (2013.01); *G02F 2202/30* (2013.01)

(58) Field of Classification Search
   CPC ........ G02B 1/002; G02B 5/008; G02B 26/00; G02F 1/19; G02F 2202/101; G02F 2202/30; G02F 1/00; G02F 1/165; G02F 1/166; G02F 1/1673; G02F 1/1675; G02F 1/16753; G02F 1/16755; G02F 1/16756; G02F 1/16757; G02F 1/1677; G02F 1/1679; G02F 1/1685; G02F 1/169; G02F 2202/10; G02F 2202/00
   USPC .......................................................... 359/237
   See application file for complete search history.

(56) References Cited

U.S. PATENT DOCUMENTS

2017/0168324 A1* 6/2017 Kim ........................ G02F 1/015

OTHER PUBLICATIONS

N. Yu et al.,, "Light Propagation with Phase Discontinuities:Generalized Laws of Reflection and Refraction", Science, vol. 334, Oct. 21, 2011, p. 333-p. 337.

* cited by examiner

*Primary Examiner* — William R Alexander
*Assistant Examiner* — Henry A Duong
(74) *Attorney, Agent, or Firm* — Faegre Drinker Biddle & Reath LLP

(57) ABSTRACT

A metasurface is capable of modulating input light including a wavelength in a range of 880 nm to 40 μm. The metasurface includes: a GaAs substrate including a light input surface into which input light is input and a light output surface facing the light input surface; an interlayer having a lower refractive index than GaAs and disposed on the light output surface side of the GaAs substrate; and a plurality of V-shaped antenna elements disposed on a side of the interlayer which is opposite to the GaAs substrate side and including a first arm and a second arm continuous with one end of the first arm.

18 Claims, 17 Drawing Sheets

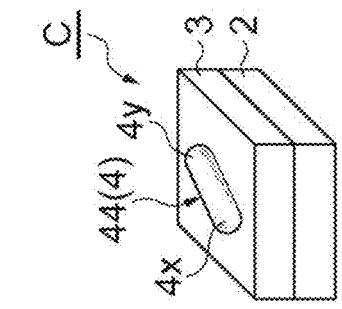
Fig.3D
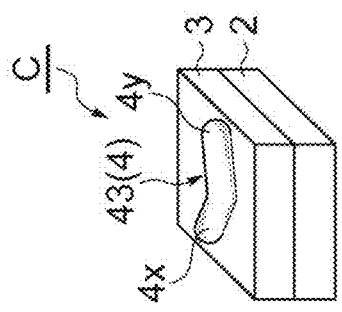
Fig.3C
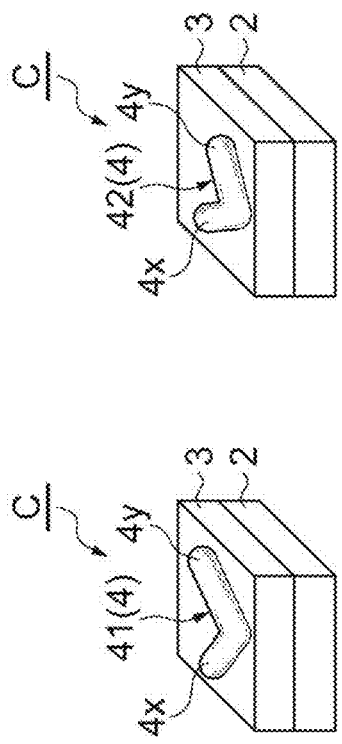
Fig.3B
Fig.3A
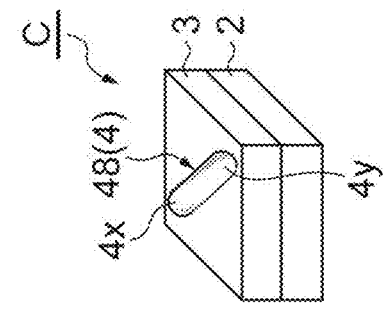
Fig.3H
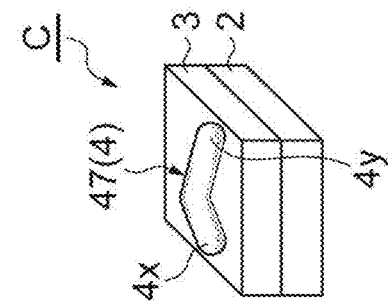
Fig.3G
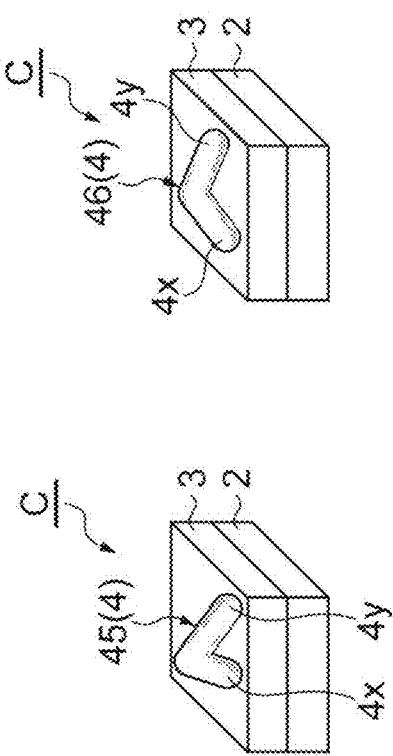
Fig.3F
Fig.3E

METASURFACE

TECHNICAL FIELD

The technical field relates to a metasurface.

BACKGROUND

As described in, for instance, Non-patent Literature (Nanfang Yu, et al. "Light Propagation with Phase Discontinuities: Generalized Laws of Reflection and Refraction," SCIENCE, VOL 334, pp. 333-337, 21 Oct. 2011), a metasurface for modulating and outputting input light is known. The metasurface described in this document includes a Si substrate including a light input surface into which input light is input and a light output surface facing the light input surface, and a plurality of V-shaped antenna elements disposed on the light output surface of the Si substrate, and modulates input light including a wavelength band of 8 μm.

SUMMARY

In one embodiment, a metasurface is capable of modulating input light including a wavelength in a range of 880 nm to 40 μm, and includes: a GaAs substrate including a light input surface into which input light is input and a light output surface facing the light input surface; an interlayer having a lower refractive index than GaAs and disposed on the light output surface side of the GaAs substrate; and a plurality of V-shaped antenna elements disposed on a side of the interlayer which is opposite to the GaAs substrate side and including a first arm and a second arm continuous with one end of the first arm.

BRIEF DESCRIPTION OF THE DRAWINGS

FIG. 3A is a schematic perspective view illustrating a first antenna element.

FIG. 3B is a schematic perspective view illustrating a second antenna element.

FIG. 3C is a schematic perspective view illustrating a third antenna element.

FIG. 3D is a schematic perspective view illustrating a fourth antenna element.

FIG. 3E is a schematic perspective view illustrating a fifth antenna element.

FIG. 3F is a schematic perspective view illustrating a sixth antenna element.

FIG. 3G is a schematic perspective view illustrating a seventh antenna element.

FIG. 3H is a schematic perspective view illustrating an eighth antenna element.

DETAILED DESCRIPTION

In the following description, identical or equivalent elements are given the same reference signs, and duplicate description thereof will be omitted.

Figure 1:
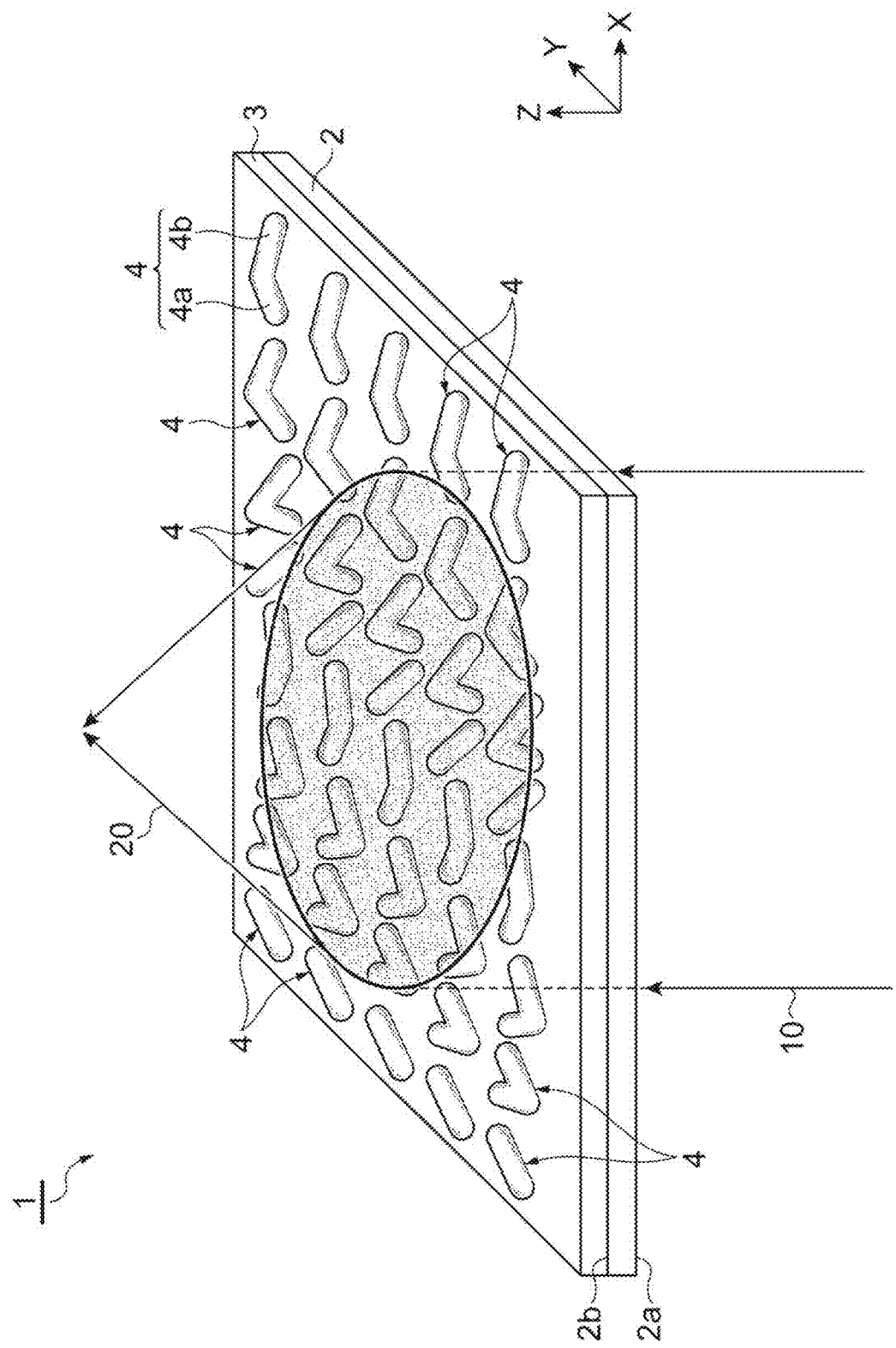
FIG. 1 is a schematic perspective view illustrating a constitution of a metasurface according to an embodiment.
Figure 2:
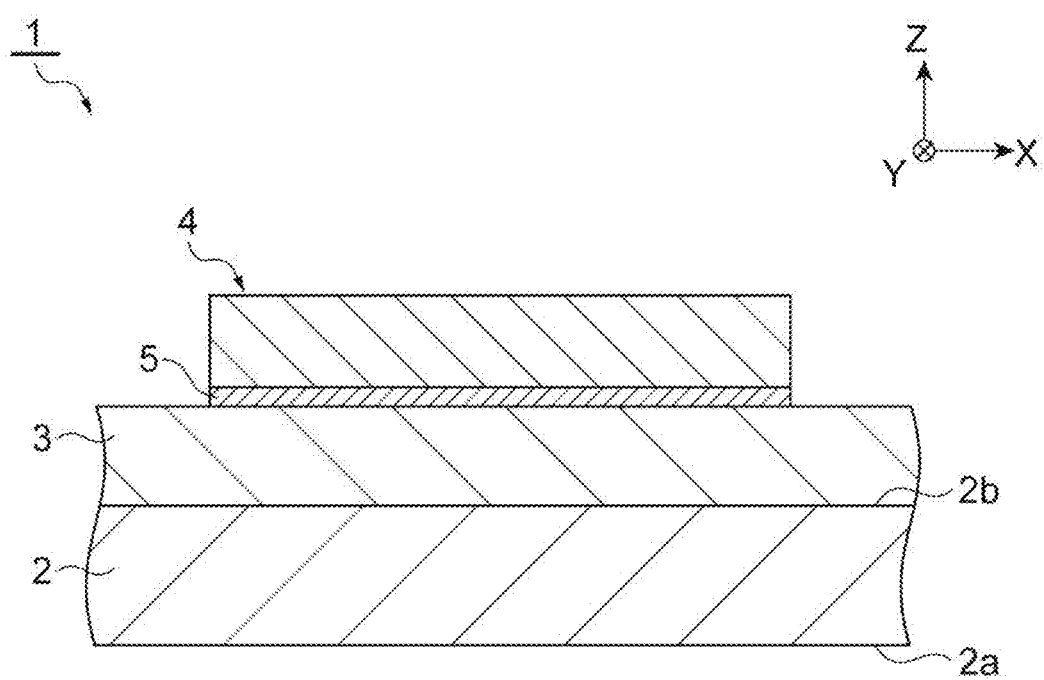
FIG. 2 is a partial sectional view of the metasurface of FIG. 1.

FIG. 1 is a schematic perspective view illustrating a constitution of a metasurface according to an embodiment. FIG. 2 is a partial sectional view of the metasurface of FIG. 1. As illustrated in FIGS. 1 and 2, a metasurface 1 modifies at least any of a phase, an amplitude, and polarization of input light 10 to output desired output light 20. In this case, the metasurface 1 performs desired modification on the phase of the input light 10 in individual elements (V-shaped antenna elements 4 to be described below) that are two-dimensionally arranged, and thereby a desired optical device can be formed. The metasurface 1 is generally known as a structure of a two-dimensional plate formed of a metamaterial.

The metasurface 1 can be used as at least one of, for instance, a condenser lens, an axicon lens, a chromatic aberration-free lens, a spherical aberration-free lens, a λ/4 wavelength plate, a λ/2 wavelength plate, an optical vortex generating plate, and a hologram element. The metasurface 1 can be used for at least one of, for instance, output light control of a micro-condenser lens, a micro-coupling device, a device (a polarization splitter or the like) having polarization selectivity and wavelength selectivity, and a photonic crystal laser of a detector array group. A thickness of the metasurface 1 can be set to be less than or equal to a wavelength of the input light 10. In the following description, a thickness direction of the metasurface 1 (a direction that is substantially perpendicular to a light output surface 2b of a GaAs substrate 2) will be defined as a "Z-axial direction," one direction perpendicular to the Z-axial direction will be defined as an "X-axial direction," and a direction perpendicular to both the X-axial direction and the Z-axial direction will be defined as a "Y-axial direction."

The metasurface 1 of the present embodiment is a transparent plasmon type metasurface. The metasurface 1 can modulate the input light 10 including a wavelength in a range of 880 nm to 40 µm. The input light 10 is for instance near infrared radiation or middle infrared radiation. In the shown example, the metasurface 1 is an optical device acting as a condenser lens. The metasurface 1 outputs the output light 20 that is condensed to a desired focal position when the input light 10 is input. The metasurface 1 includes the GaAs substrate 2, an interlayer 3, and the plurality of V-shaped antenna elements 4.

The GaAs substrate 2 is a plate-like body formed of gallium arsenide (GaAs), and includes a light input surface 2a into which the input light 10 is input, and a light output surface 2b to which the output light 20 is output. The light input surface 2a is one principal surface of the GaAs substrate 2. The light output surface 2b is opposite to the light input surface 2a. The light output surface 2b is the other principal surface of the GaAs substrate 2.

The interlayer 3 is provided at the light output surface 2b side of the GaAs substrate 2. In other words, the interlayer 3 is arranged on the light output surface 2b of the GaAs substrate 2. Here, the interlayer 3 is stacked on the light output surface 2b. The interlayer 3 has a lower refractive index than GaAs. The refractive index is a ratio of a speed of light in vacuum to a speed of light in a material of the interlayer 3. A refractive index of GaAs is 3.5, for instance, at a wavelength of 1 µm.

The interlayer 3 is a layer including a SiN layer formed of SiN (silicon nitride), a $TiO_2$ layer formed of $TiO_2$ (titanium oxide), a $HfO_2$ layer formed of $HfO_2$ (hafnium oxide), a $Ta_2O_5$ layer formed of $Ta_2O_5$ (tantalum pentoxide), a $Nb_2O_5$ layer formed of $Nb_2O_5$ (niobium pentoxide), an $Al_2O_3$ layer formed of $Al_2O_3$ (aluminum oxide), a $SiO_2$ layer formed of $SiO_2$ (silicon dioxide), or at least one thereof. The SiN layer includes a $Si_3N_4$ layer formed of $Si_3N_4$.

The V-shaped antenna elements 4 are provided at a side of the interlayer 3 which is opposite to the GaAs substrate 2 side. In other words, the V-shaped antenna elements 4 are arranged on a surface of the interlayer 3 which is opposite to the GaAs substrate 2 side. Here, the V-shaped antenna elements 4 are disposed on the surface of the interlayer 3 via an adhesive layer 5.

The adhesive layer 5 is formed of titanium (Ti), chromium (Cr), platinum (Pt), or at least one thereof. A thickness of the adhesive layer 5 is, for instance, from 5 nm to 10 nm. The adhesive layer 5 enhances adhesion of the V-shaped antenna elements 4 to the interlayer 3, and suppresses detachment of the V-shaped antenna elements 4. For example, the adhesive layer 5 has adhesion that is stronger than adhesion between the interlayer 3 and the V-shaped antenna element 4 with respect to each of the interlayer 3 and the V-shaped antenna element 4. The adhesion is synonymous with attachability, attachment force, adhesive force, or the like.

The V-shaped antenna elements 4 are so-called positive type elements. The V-shaped antenna elements 4 are convexes disposed on the interlayer 3. The V-shaped antenna elements 4 are formed of a metal such as gold (Au). The V-shaped antenna elements 4 are provided to bulge on the surface of the interlayer 3 which is opposite to the GaAs substrate 2 side in the Z-axial direction. The each of the V-shaped antenna elements 4 has a thickness (a dimension in the Z direction) in a range of 30 nm to 500 nm. For example, 160,000 V-shaped antenna elements 4 are arranged in an area of 100 µm×100 µm on the interlayer 3. Each of the V-shaped antenna elements 4 includes a first arm 4x having a projection shape, and a second arm 4y that is continuous to one end of the first arm 4x and has a projection shape.

Figure 4A:
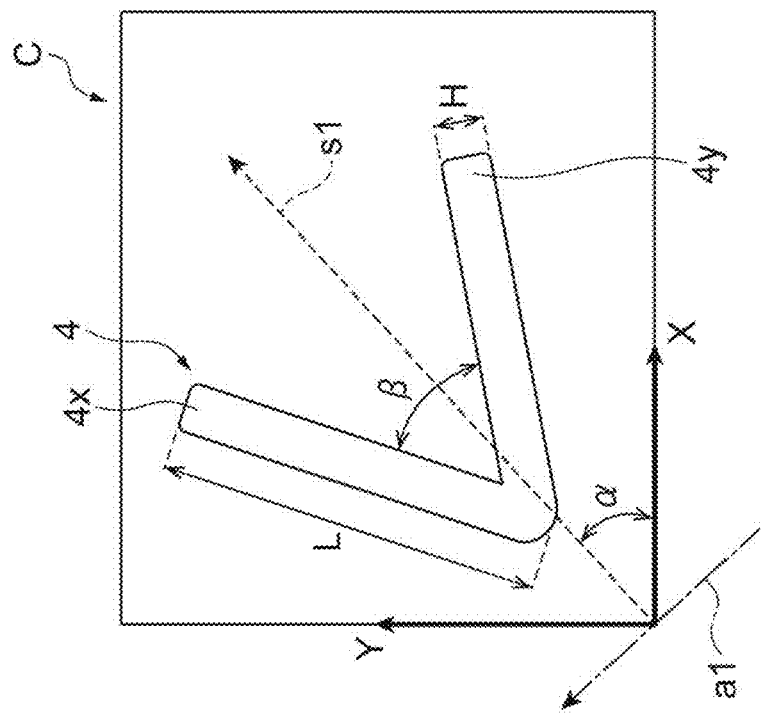
FIG. 4A is a view for defining a shape of a V-shaped antenna element having a basic structure.
Figure 4B:
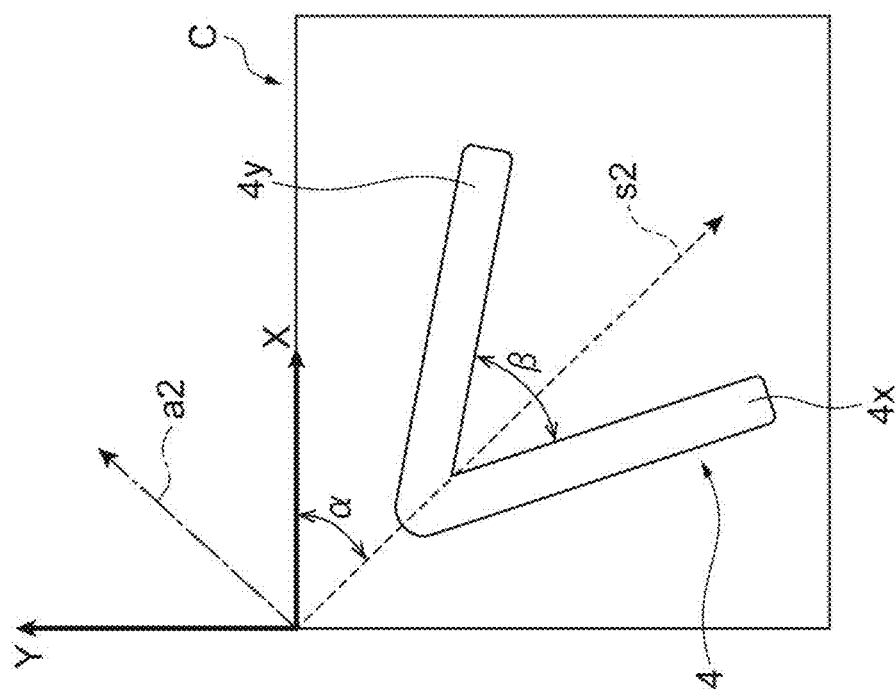
FIG. 4B is a view for defining a shape of a V-shaped antenna element having an inverse symmetric structure.

FIGS. 3A to 3H are schematic perspective views illustrating first to eighth antenna elements 41 to 48, respectively. FIG. 4A is a view for defining a shape of the V-shaped antenna element 4 having a basic structure. FIG. 4B is a view for defining a shape of the V-shaped antenna element 4 having an inverse symmetric structure. In FIGS. 3 and 4, a unit cell C, that is, a rectangular plate-shaped domain including only one V-shaped antenna element 4 within the metasurface 1, is shown. The unit cell C has sides in the X-axial and Y-axial directions. Here, a size of the unit cell C is 240 nm×240 nm (dimensions of the X-axial and Y-axial directions are both 240 nm).

As illustrated in FIG. 3, the plurality of V-shaped antenna elements 4 include eight types of first to eighth antenna elements 41 to 48 having V-shaped structures different in shape from one another. To be specific, the plurality of V-shaped antenna elements 4 include first to fourth antenna elements 41 to 44 that are V-shaped structures having four types of basic structures, and fifth to eighth antenna elements 45 to 48 that are V-shaped structures having inverse symmetric structures in which the four types of basic structures are inverted with respect to the X axis.

As illustrated in FIG. 4A, in the V-shaped antenna elements 4 (the first to fourth antenna elements 41 to 44) having the basic structures, an axis s1 of symmetry which has an angle α with respect to an X axis and an axis a1 of asymmetry perpendicular to the axis s1 of symmetry are set. The angle α is 45 degrees. The angle by which polarization of the output light 20 is rotated in polarization of the input light 10 can be determined based on the angle α. When the angle α is 45 degrees, the polarization of the output light 20 is rotated 90 degrees with respect to the polarization of the input light 10. The V-shaped antenna element 4 having the basic structure presents a line symmetrical shape via the axis s1 of symmetry.

In the following description, an angle formed by the first arm 4x and the second arm 4y will be defined as an inter-arm angle β, a longitudinal length of each of the first arm 4x and the second arm 4y will be defined as an arm length L, and a width of each of the first arm 4x and the second arm 4y will be defined as an arm width H.

As illustrated in FIG. 4B, the V-shaped antenna elements 4 (the fifth to eighth antenna elements 45 to 48) having the inverse symmetric structures are structures in which the basic structures of FIG. 4A are inverted with respect to the X axis. In the V-shaped antenna element 4 having the inverse symmetric structure, an axis s2 of symmetry perpendicular to the axis s1 of symmetry (see FIG. 4A) and an axis a2 of asymmetry perpendicular to the axis s2 of symmetry are set. Like the axis s1 of symmetry, the axis s2 of symmetry has an angle α with respect to the X axis. The V-shaped antenna element 4 having the inverse symmetric structure presents a line symmetrical shape via the axis s2 of symmetry. In the V-shaped antenna element 4 having the inverse symmetric structure, phase modulation of +180 degrees is obtained with respect to the V-shaped antenna element 4 having the basic structure.

Returning to FIG. 3, an angle formed by the first arm 4x and the second arm 4y in each of the plurality of V-shaped antenna elements 4 is greater than or equal to 70 degrees. That is, the inter-arm angles β of the first to eighth antenna elements 41 to 48 are not less than 70 degrees and not more than 180 degrees. Thus, the inter-arm angles β of the first to eighth antenna elements 41 to 48 are an angle in a range of 70 degrees to 180 degrees. The arm widths H of the first to eighth antenna elements 41 to 48 are equal to one another, and are for instance 40 nm.

As illustrated in FIG. 3A, the inter-arm angle β of the first antenna element 41 is 75 degrees. The arm length L of the first antenna element 41 is longer than those of the second to fourth antenna elements 42 to 44. As illustrated in FIG. 3B, the inter-arm angle β of the second antenna element 42 is 90 degrees. The arm length L of the second antenna element 42 is shorter than that of the first antenna element 41, and is longer than those of the third and fourth antenna elements 43 and 44.

As illustrated in FIG. 3C, the inter-arm angle β of the third antenna elements 43 is 120 degrees. The arm length L of the third antenna element 43 is shorter than those of the first and second antenna elements 41 and 42, and is longer than that of the fourth antenna element 44. As illustrated in FIG. 3D, the inter-arm angle β of the fourth antenna element 44 is 180 degrees. That is, the fourth antenna element 44 has a shape in which the first arm 4x and the second arm 4y extend straight along the same straight line. The arm length L of the fourth antenna element 44 is shorter than those of the first to third antenna elements 41 to 43.

As illustrated in FIG. 3E, the fifth antenna element 45 has the inverse symmetric structure of the first antenna element 41 with respect to the X axis. The inter-arm angle β of the fifth antenna element 45 is 75 degrees. The arm length L of the fifth antenna element 45 is longer than those of the sixth to eighth antenna elements 46 to 48. As illustrated in FIG. 3F, the sixth antenna element 46 has the inverse symmetric structure of the second antenna element 42 with respect to the X axis. The inter-arm angle β of the sixth antenna element 46 is 90 degrees. The arm length L of the sixth antenna element 46 is shorter than that of the fifth antenna element 45, and is longer than those of the seventh and eighth antenna elements 47 and 48.

As illustrated in FIG. 3G, the seventh antenna element 47 has the inverse symmetric structure of the third antenna element 43 with respect to the X axis. The inter-arm angle β of the seventh antenna element 47 is 120 degrees. The arm length L of the seventh antenna element 47 is shorter than those of the fifth and sixth antenna elements 45 and 46, and is longer than that of the eighth antenna element 48. As illustrated in FIG. 3H, the eighth antenna element 48 has the inverse symmetric structure of the fourth antenna element 44 with respect to the X axis. The inter-arm angle β of the eighth antenna element 48 is 180 degrees. That is, the eighth antenna elements 48 has a shape in which the first arm 4x and the second arm 4y extend straight along the same straight line. The arm length L of the eighth antenna element 48 is shorter than those of the fifth to seventh antenna elements 45 to 47.

The plurality of V-shaped antenna elements 4 are configured to be usable as the phase modulation optical devices. That is, the first to eighth antenna elements 41 to 48 are identical in intensity of the output light 20 which is output according to input of the input light 10. The first to eighth antenna elements 41 to 48 perform phase modulation of 0 to 2π on the input light 10, which will be described below in detail.

Figure 5:
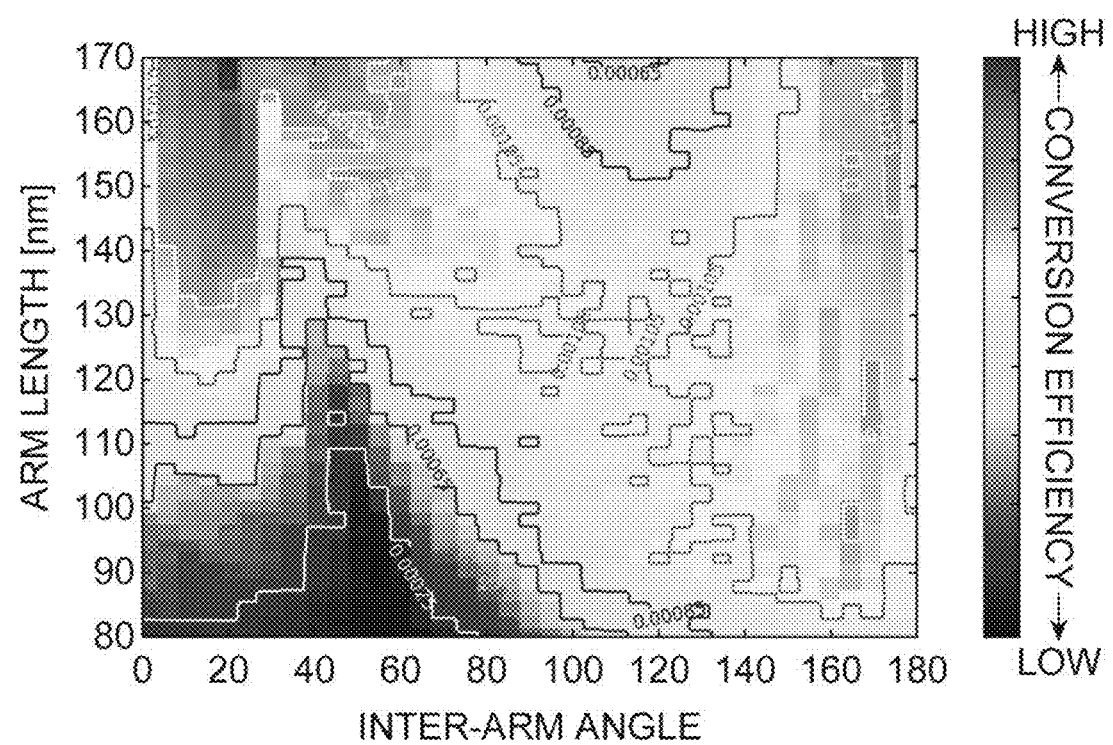
FIG. 5 is a diagram illustrating simulation results analyzed by changing an inter-arm angle and an arm length of the V-shaped antenna element with respect to an intensity of output light.

FIG. 5 is a diagram illustrating simulation results analyzed by changing the inter-arm angle β and the arm length L of the V-shaped antenna element 4 with respect to an intensity of the output light 20. Here, a finite difference time domain (FDTD) method is used for the simulation. Simulation conditions are as follows. In detail, the unit cell C is set as a target of analysis, the thickness of the interlayer 3 is set to 118 nm, the thickness of the V-shaped antenna element 4 is set to 30 nm, and the thickness of the adhesive layer 5 is set to 5 nm. The input light 10 is set as light that is orthogonally input from the light input surface 2a of the GaAs substrate 2. A direction in which the input light 10 is polarized is set as a direction of a resultant vector of a directional vector corresponding to the axis s1 of symmetry and a directional vector corresponding to the axis a1 of asymmetry. Each contour line of FIG. 5 is an iso-intensity contour line that is a line connecting the inter-arm angle β and the arm length L with the same intensity of the output light 20.

According to the simulation results shown in FIG. 5, the iso-intensity contour lines having the same intensity of the output light 20 can be obtained. The intensity of the output light 20 is proportional to the square of electric field intensity.

Figure 6:
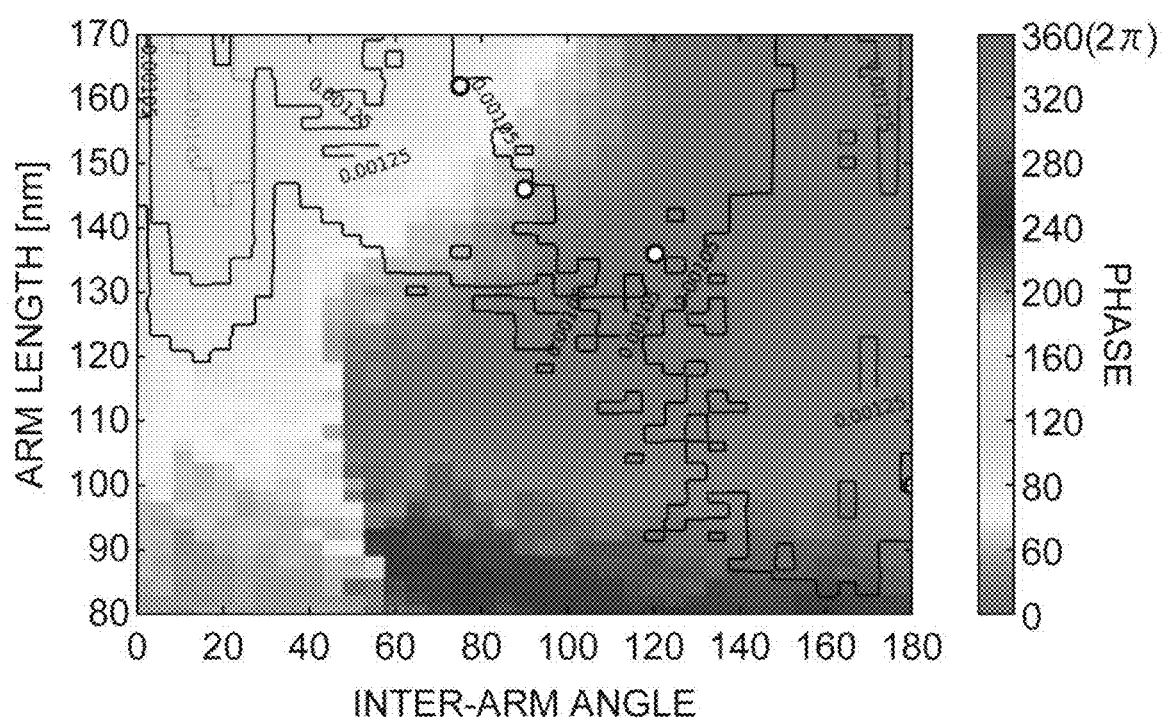
FIG. 6 is a diagram illustrating simulation results analyzed by changing an inter-arm angle and an arm length of the V-shaped antenna element with respect to a phase of the output light.

FIG. 6 is a diagram illustrating simulation results analyzed by changing the inter-arm angle β and the arm length L of the V-shaped antenna element 4 with respect to a phase (a phase of an electric field) of the output light 20. Here, the FDTD method is used for the simulation. Simulation conditions are identical to those of FIG. 5. Contour lines of FIG. 6 are equivalent to the iso-intensity contour lines obtained from the results shown in FIG. 5.

According to the simulation results shown in FIG. 6, it is found that a domain in which phase modulation of 0 to π (phase modulation of 0 to 2π by use of the inverse symmetric structure) is possible can be selected on or around the iso-intensity contour line. Further, it is found that the phase modulation of 0 to π on or around the iso-intensity contour line is present in a domain in which the inter-arm angle β is equal to or more than 70 degrees. Therefore, it is found that the shape of the V-shaped antenna element 4 can be selected from shapes in which the inter-arm angle β is equal to or more than 70 degrees (see selection points shown by a white circle in the figure).

Figure 7:
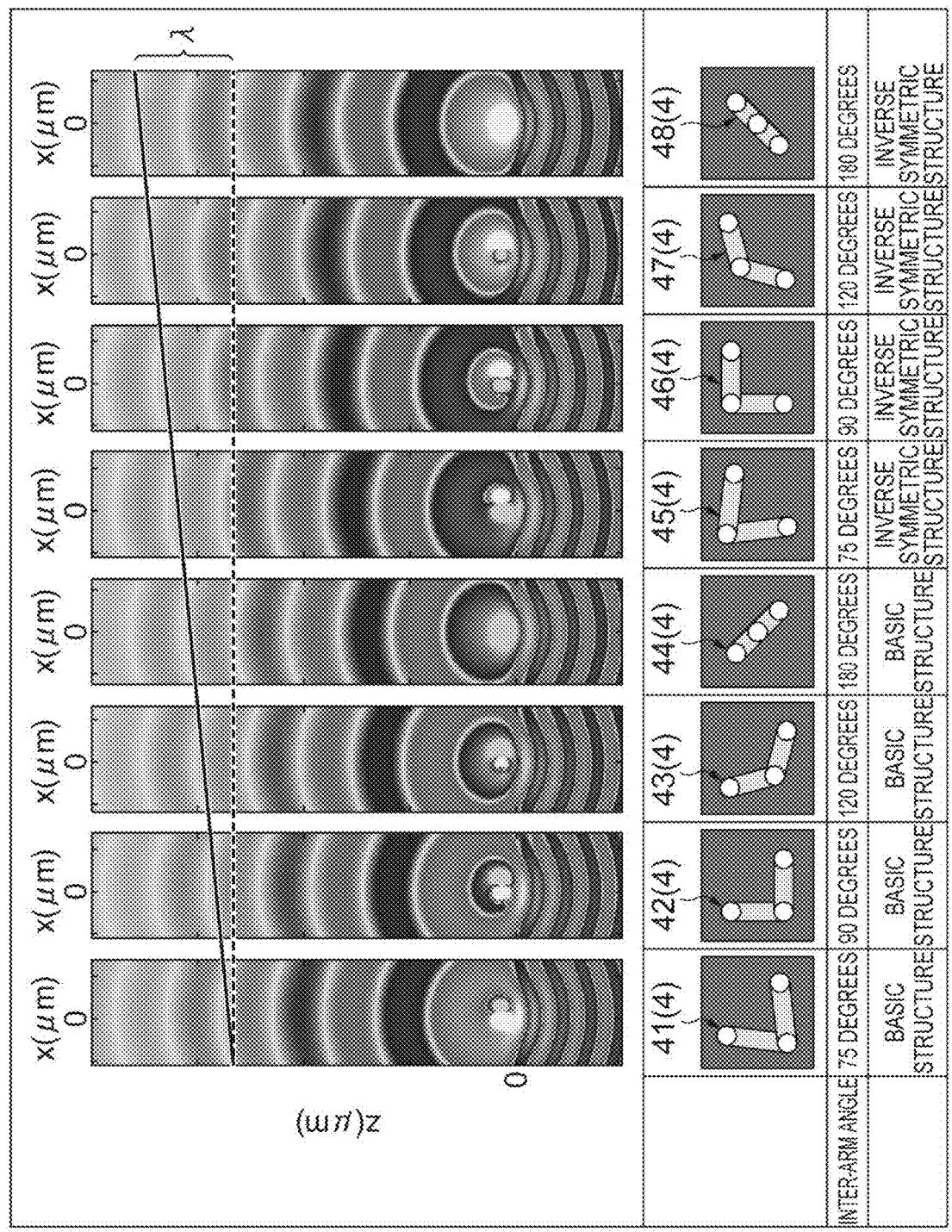
FIG. 7 is a diagram illustrating results of analyzing development of electric fields caused by first to eighth antenna elements.

FIG. 7 is a diagram illustrating results of analyzing development of electric fields caused by first to eighth antenna elements 41 to 48 using the FDTD. Here, for the analysis, the unit cell C is set as a target of analysis, the thickness of the interlayer 3 is set to 118 nm, the thickness of the V-shaped antenna element 4 is set to 30 nm, and the thickness of the adhesive layer 5 is set to 5 nm. The input light 10 is set as light that is orthogonally input from the light input surface 2a of the GaAs substrate 2. In the phase development diagrams in the figure, a domain in which the Z axis is equal to or less than 0 indicates the GaAs substrate 2 side rather than the V-shaped antenna elements 4, and a domain in which the Z axis is greater than 0 indicates an atmosphere side (an output side). Each of the phase development diagrams in the figure shows phase development of the electric field caused by the V-shaped antenna element 4 shown therebelow.

In the example shown in FIG. 7, the electric fields of the output light 20 caused by the first to eighth antenna elements 41 to 48 are developed in that order. It is found that the electric field of the output light 20 caused by the eighth antenna element 48 is developed by λ (one wavelength) with respect to the electric field caused by the first antenna element 41. Thereby, it can be confirmed that the phase modulation of 0 to 2π is performed by use of the first to eighth antenna elements 41 to 48.

The first to eighth antenna elements 41 to 48 satisfy the following formula (1), and are arranged on the interlayer 3 such that a desired phase difference occurs at a desired position. Thereby, when the input light 10 is input from the light input surface 2a of the GaAs substrate 2, a condenser lens for condensing the output light 20 at a desired focal position can be formed. In the following formula (1), x and y indicate coordinates within a plane, φ indicates an amount of phase shift in the coordinates (x, y), and f indicates a desired focal distance.

[Formula 1]

$$\varphi(x, y) = \frac{2\pi}{\lambda}\left(\sqrt{x^2 + y^2 + f^2} - f\right) \quad (1)$$

Figure 8A:
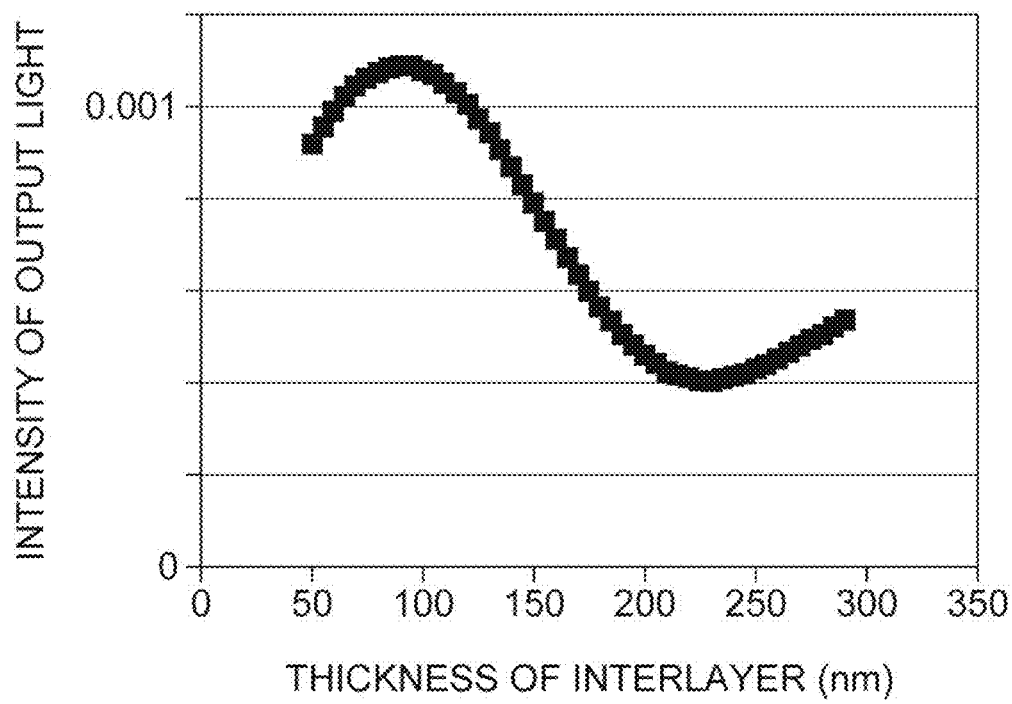
FIG. 8A is a graph illustrating results analyzed by changing a thickness of an interlayer with respect to the intensity of the output light.
Figure 8B:
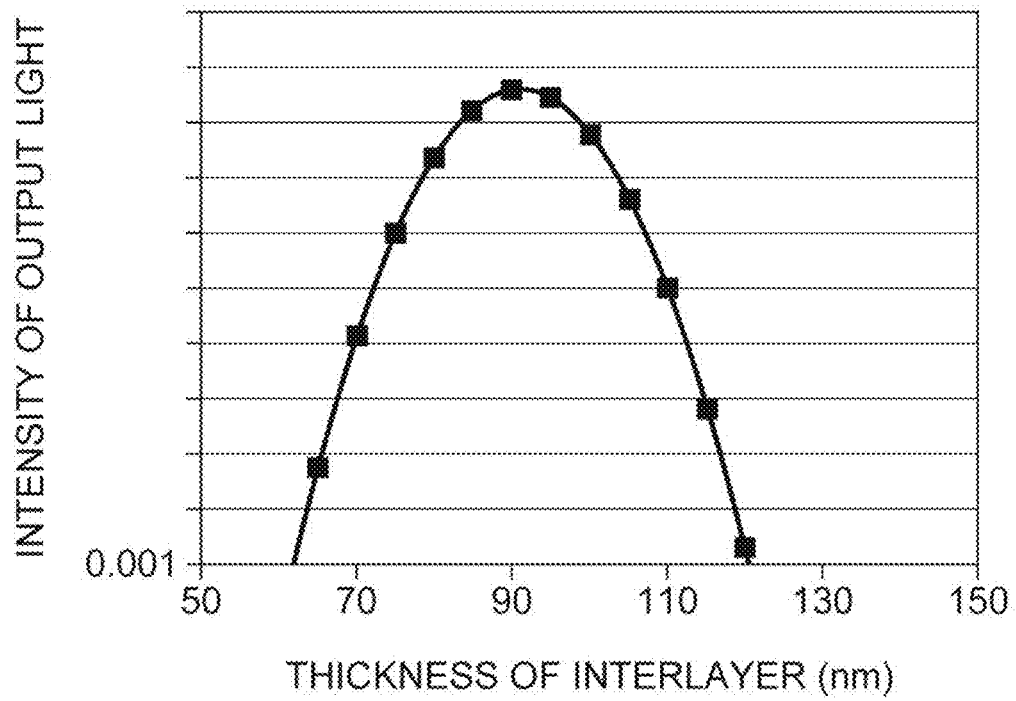
FIG. 8B is an enlarged graph illustrating a part of FIG. 8A.
Figure 9A:
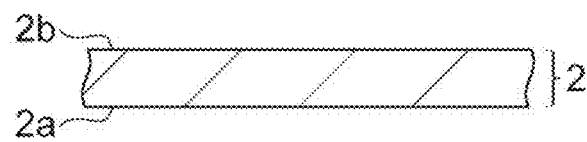
FIG. 9A is a view illustrating a method of manufacturing the metasurface of FIG. 1.
Figure 9B:
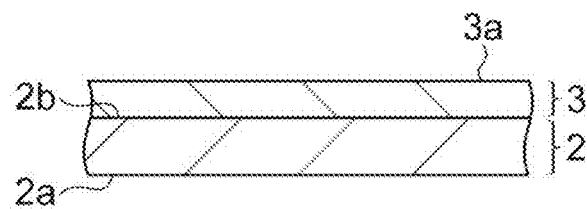
FIG. 9B is a view illustrating continuation of FIG. 9A.
Figure 9C:
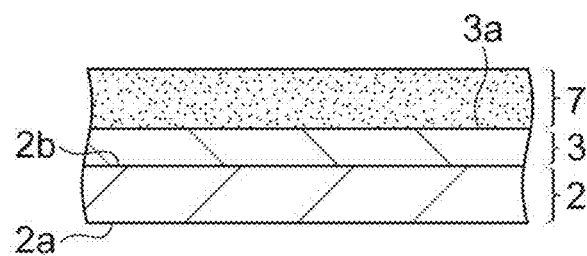
FIG. 9C is a view illustrating continuation of FIG. 9B.
Figure 9D:
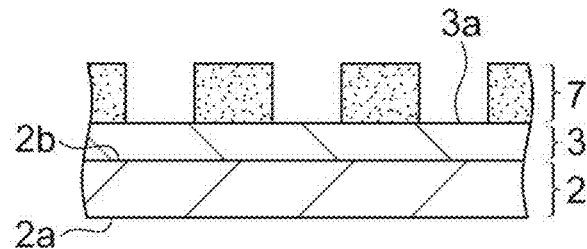
FIG. 9D is a view illustrating continuation of FIG. 9C.
Figure 9E:
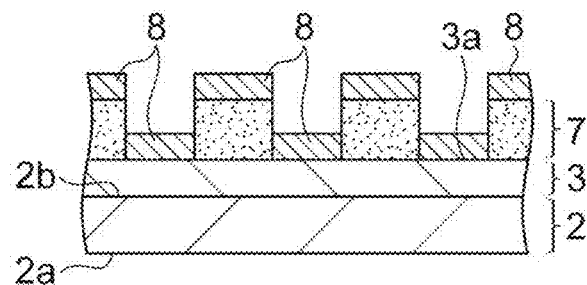
FIG. 9E is a view illustrating continuation of FIG. 9D.
Figure 9F:
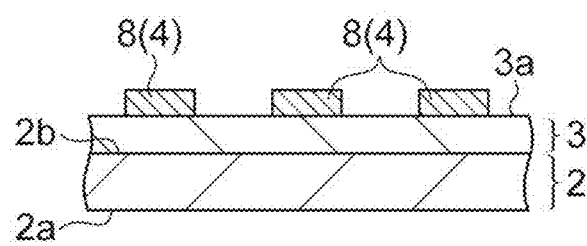
FIG. 9F is a view illustrating continuation of FIG. 9E.

FIG. 8A is a graph illustrating results analyzed by changing a thickness of the interlayer 3 with respect to the intensity of the output light 20. FIG. 8B is an enlarged graph illustrating a part of FIG. 8A. Here, for the analysis, the unit cell C is set as a target of analysis, the V-shaped antenna elements 4 are set to a thickness of 30 nm, and the adhesive layer 5 is set to a thickness of 5 nm. The input light 10 is light that is orthogonally input from the light input surface 2a of the GaAs substrate 2. The inter-arm angle β in the V-shaped antenna element 4 is set to 120 degrees, and the arm length is set to 136 nm.

As illustrated in FIG. 8A, for example, when a wavelength of the input light 10 is set to 940 nm that is an oscillation wavelength of a photonic crystal laser, the intensity of the output light 20 varies in a sine curve shape in relation to the thickness of the interlayer 3. As illustrated in FIG. 8B, when the thickness of the interlayer 3 is 90 nm, the intensity of the output light 20 has a highest value. When the interlayer 3 has the thickness in a range of 60 nm to 120 nm (that is, 90±30 nm), the intensity of the output light 20 has a value within a high range above a certain value. The intensity of the output light 20 is also called a cross-scattered light intensity. The intensity of the output light 20 is synonymous with the conversion efficiency of light caused by the V-shaped antenna element 4. In the metasurface 1 of the present embodiment, the interlayer 3 has the thickness in a range of 60 nm to 120 nm. To be specific, the thickness of the interlayer 3 may be 90 nm.

The thickness d of the interlayer 3 may be a value that satisfies the following formula (2). In the following formula (2), λ (nm) is the wavelength of the input light 10, and n is the refractive index of the interlayer 3. The wavelength λ of the input light 10 ranges from 880 nm to 40 μm, and thus the interlayer 3 has the thickness d in a range of 60 nm to 5 μm.

$$d = \lambda/4n \quad (2)$$

The thickness d of the interlayer 3 may be a value that satisfies the following formula (3). In the following formula (3), n is the refractive index of the interlayer 3, and $\lambda_0$ is the central operating wavelength. When the central operating wavelength is set to 940 nm that is the oscillation wavelength of the photonic crystal laser, the thickness d of the interlayer 3 may be 90 nm that is within the range of the following formula (3). In this case, the thickness of the adhesive layer 5 can be set to 5 nm, and the thickness of the V-shaped antenna element 4 can be set to 30 nm. The size of the unit cell C can be set to 240 nm×240 nm.

[Formula 3]

$$0.15 \times \frac{\lambda_0}{n} \leq d \leq 0.3 \times \frac{\lambda_0}{n} \quad (3)$$

FIG. 9 is a flow diagram illustrating a method of manufacturing the metasurface 1. When the metasurface 1 is manufactured, a GaAs substrate 2 is prepared first as illustrated in FIG. 9A. As illustrated in FIG. 9B, an interlayer 3 is formed on a light output surface 2b of the GaAs substrate 2. As illustrated in FIG. 9C, a resist layer 7 is formed on a surface 3a of the interlayer 3 which is opposite to the GaAs substrate 2 side. As illustrated in FIG. 9D, an electron beam is applied to the resist layer 7 using an electron beam lithography device, and a printing pattern corresponding to the shapes of the V-shaped antenna elements 4 is exposed. As illustrated in FIG. 9E, metal layers 8 are vapor-deposited on the resist layer 7 and the surface 3a of the interlayer 3. Here, a Ti layer and a Au layer are vapor-deposited in that order. As illustrated in FIG. 9F, the resist layer 7 is removed by a liftoff process along with the metal layers 8 on the resist layer 7. As a result, the metasurface 1 is obtained. The metal layers 8 vapor-deposited on the surface 3a of the interlayer 3 constitute the adhesive layer 5 and the V-shaped antenna elements 4.

As described above, the metasurface 1 includes the GaAs substrate 2. The interlayer 3 is disposed on the light output surface 2b side of the GaAs substrate 2. The V-shaped antenna elements 4 are disposed on a side of the interlayer 3 which is opposite to the GaAs substrate 2 side. The interlayer 3 has a lower refractive index than GaAs. It is found that the GaAs substrate 2 is used as a substrate and thereby the metasurface 1 capable of modulating input light including a wavelength in a range of 880 nm to 40 μm can be realized. Further, it is found that the interlayer 3 having a lower refractive index than GaAs is provided in the case in which the GaAs substrate 2 is provided and thereby the input light 10 directed from the GaAs substrate 2 toward the V-shaped antenna elements 4 can be more easily guided and smoothly arrive at the V-shaped antenna elements 4, and the intensity of the output light 20 output from the V-shaped antenna elements 4 can be increased. Therefore, according to the present embodiment, in the metasurface 1 capable of modulating the input light 10 including a wavelength in a range of 880 nm to 40 µm, the conversion efficiency of light caused by the V-shaped antenna elements 4 can be improved.

As described above, the metasurface 1 is configured to be usable as the phase modulation optical device. That is, the first to eighth antenna elements 41 to 48 are identical in the intensity of the output light 20 that is output according to the input of the input light 10. The first to eighth antenna elements 41 to 48 perform the phase modulation of 0 to 2π on the input light 10. Therefore, according to the metasurface 1, the conversion efficiency of light caused by the V-shaped antenna elements 4 can be improved while securing an ability to modulate phases of 0 to 2π.

In the metasurface 1, the plurality of V-shaped antenna elements 4 are formed using the inverse symmetric structure. Thereby, the phase modulation of 0 to 2π of the input light 10 can be easily realized. In the metasurface 1, the unit cells C are arranged with adequate space, and thereby an arbitrary wavefront of the output light 20 can be formed.

Figure 10:
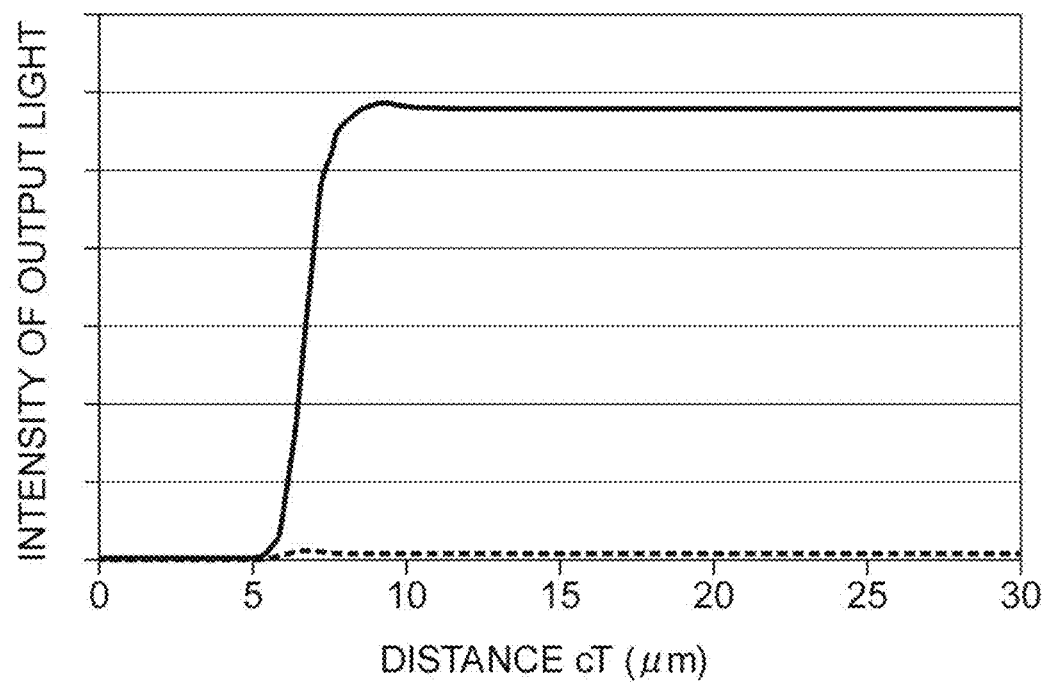
FIG. 10 is a diagram illustrating results of analyzing a difference in the intensity of the output light due to presence or absence of the interlayer.

FIG. 10 is a diagram illustrating results of analyzing a difference in the intensity of the output light 20 due to presence or absence of the interlayer 3 of the metasurface 1. Here, for the analysis, a transmission monitor is disposed at a position spaced 4 µm away from the V-shaped antenna element 4, and a change in time of the output light 20 is analyzed by the FDTD method in each of a first example and a first comparative example. The longitudinal axis in the figure indicates the intensity of the output light 20. The transverse axis in the figure is cT that is a value obtained by multiplying the velocity of light (c=3.0×10$^{15}$ [µm/sec]) by a calculation time step (e.g., in this case, T=0.004505×10$^{-15}$ [sec]) determined according to coolant conditions. The unit of cT is µm. The first example is the metasurface 1 of the present embodiment. The first comparative example is the metasurface 1 without the interlayer 3. A solid line in the figure shows results according to the first example, and a broken line in the figure shows results according to the first comparative example.

As illustrated in FIG. 10, the interlayer 3 is also provided for the metasurface 1. Thereby, it can be confirmed that the intensity of the output light 20 is greatly increased. To be specific, with respect to a case in which the interlayer 3 is not provided, it can be confirmed that the intensity of the output light 20 is increased about 80-fold.

In the metasurface 1, the interlayer 3 has the thickness in a range of 60 nm to 5 µm. In this constitution, the effect that the input light 10 is easily guided to the V-shaped antenna elements 4 can be effectively exhibited. As shown in the results of the analysis of FIGS. 8A and 8B, the conversion efficiency of light caused by the V-shaped antenna elements 4 can be further improved.

In the metasurface 1, the interlayer 3 is a SiN layer, a TiO$_2$ layer, or a HfO$_2$ layer. In this constitution, the interlayer 3 having a lower refractive index than GaAs can be realized concretely. A type of the interlayer 3 is not particularly limited, and various layers may be adopted as the interlayer 3 as long as they have a lower refractive index than GaAs.

Figure 11A:
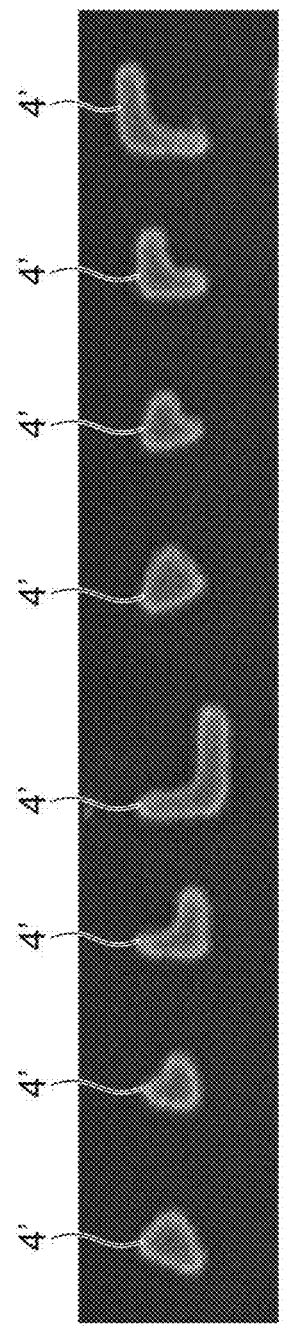
FIG. 11A is an SEM image illustrating V-shaped antenna elements of a metasurface according to a comparative example.
Figure 11B:
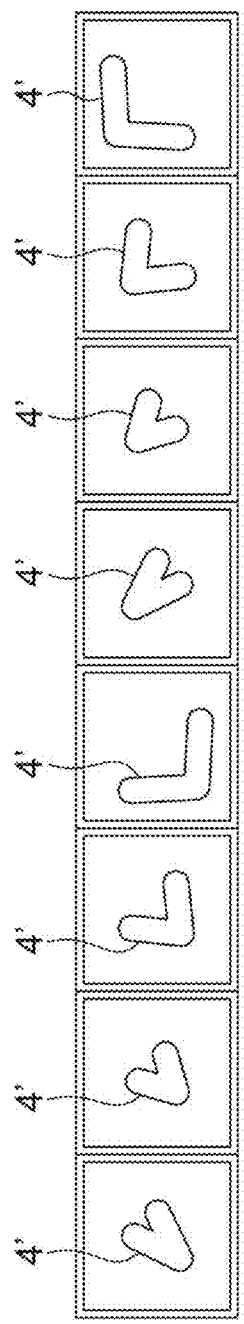
FIG. 11B is a design drawing illustrating the V-shaped antenna elements of the metasurface according to the comparative example.

FIG. 11A is a scanning electron microscope (SEM) image illustrating V-shaped antenna elements 4' of a metasurface according to a comparative example. FIG. 11B is a design drawing illustrating the V-shaped antenna elements 4' of the metasurface according to the comparative example.

In FIGS. 11A and 11B, V-shaped antenna elements 4' having inter-arm angles β of 40 degrees, 60 degrees, 80 degrees, 95 degrees, 40 degrees, 60 degrees, 80 degrees, and 95 degrees in turn from the left in the figure are shown. As illustrated in FIGS. 11A and 11B, when the V-shaped antenna elements 4' having inter-arm angles β of 40 degrees and 60 degrees are manufactured, a printing pattern is spread by a proximity effect of the electron beam when the electron beam is applied, and thus it is difficult to form a shape as in a design drawing. It is found that, when actually manufactured, in the V-shaped antenna elements 4' having inter-arm angles β of 40 degrees and 60 degrees, the V shapes sometimes easily collapse or become triangular shapes rather than the V shapes. Especially, as the wavelength of the input light 10 becomes shorter (e.g., shorter than 1 µm), and the size of the unit cell C becomes smaller, this tendency is remarkable. When the size of the unit cell C is reduced to 240 nm×240 nm, the V-shaped antenna elements 4' having acute inter-arm angles β cannot be manufactured.

In this respect, in the metasurface 1, the inter-arm angle β in each of the plurality of V-shaped antenna elements 4 is equal to or more than 70 degrees. Thereby, the V-shaped antenna elements 4 can be easily manufactured. Even when the size of the unit cell C is reduced to 240 nm×240 nm, the V-shaped antenna elements 4 can be manufactured. In an electron beam printing process when the metasurface 1 is manufactured, a bad influence caused by the spread of the printing pattern resulting from the proximity effect of the electron beam can be reduced.

In the metasurface 1, the each of the plurality of V-shaped antenna elements 4 is convex disposed on the interlayer 3. Thereby, in the metasurface 1 having the V-shaped antenna elements 4 formed as so-called positive type elements, the conversion efficiency of light caused by the V-shaped antenna elements 4 can be improved.

Figure 12A:
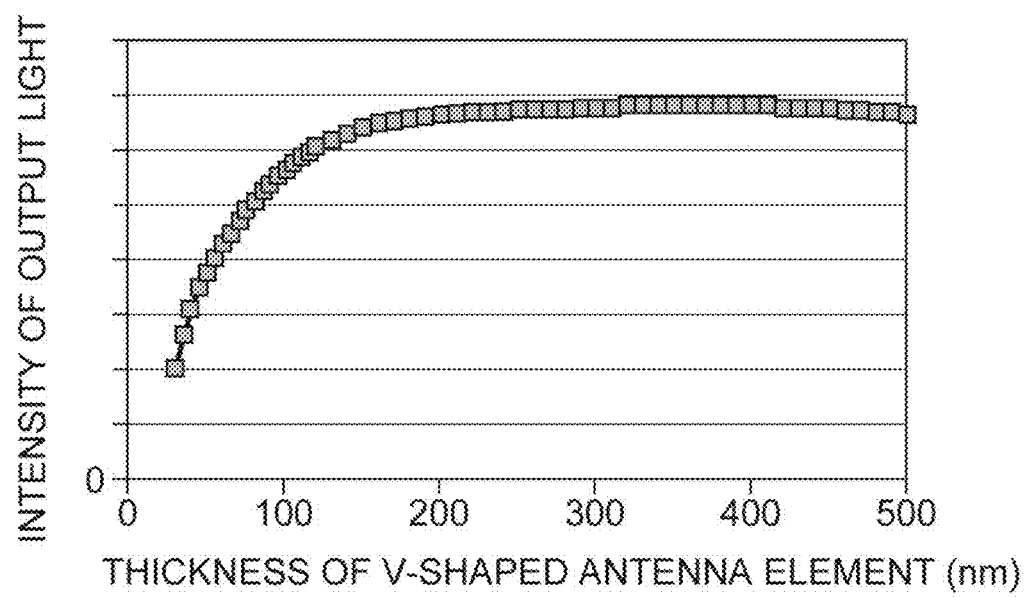
FIG. 12A is a graph illustrating results analyzed by changing the thickness of the V-shaped antenna element with respect to the intensity of the output light.
Figure 12B:
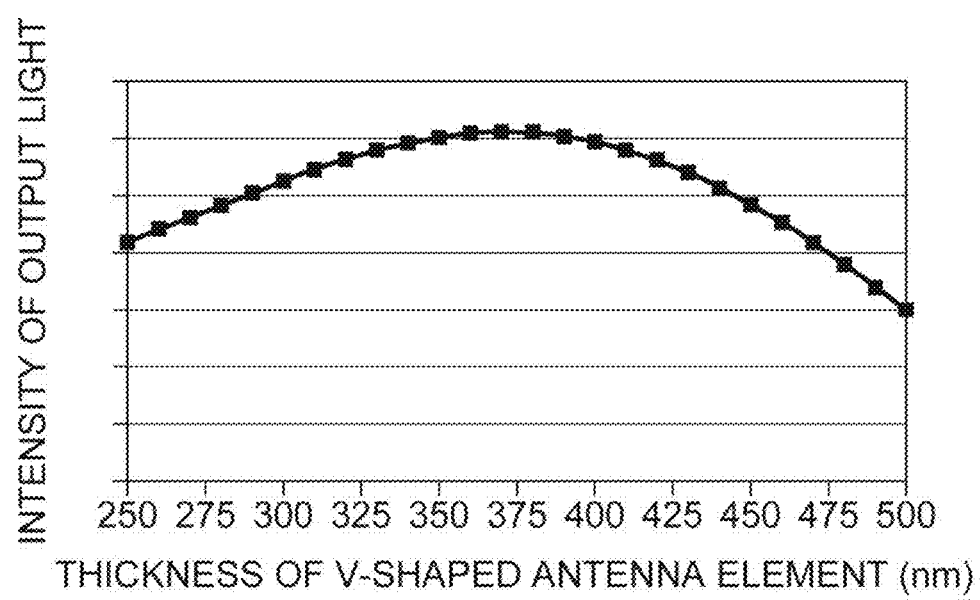
FIG. 12B is an enlarged graph illustrating a part of FIG. 12A.

FIG. 12A is a graph illustrating results analyzed by changing the thickness of the V-shaped antenna element 4 with respect to the intensity of the output light 20. FIG. 12B is an enlarged graph illustrating a part of FIG. 12A. Here, for the analysis, the unit cell C is set as a target of analysis, the thickness of the interlayer 3 is set to 90 nm, and the thickness of the adhesive layer 5 is set to 5 nm. The input light 10 is set as light that is orthogonally input from the light input surface 2$a$ of the GaAs substrate 2. The inter-arm angle β of the V-shaped antenna element 4 is set to 120 degrees, and the arm length thereof is set to 136 nm.

As illustrated in FIG. 12A, as the thickness of the V-shaped antenna element 4 increases, there is a tendency for the intensity of the output light 20 to sharply increase, then gently increase to reach a peak, and then gently decrease. As illustrated in FIG. 12B, it is found that, when the thickness of the V-shaped antenna element 4 is 370 nm, the intensity of the output light 20 has a highest value. It is found that, when the thickness of the V-shaped antenna element 4 ranges from 200 nm to 500 nm, the intensity of the output light 20 has a value within a high range. It is found that, when the thickness of the V-shaped antenna element 4 ranges from 300 nm to 450 nm, the intensity of the output light 20 has a value within a higher range. It is found that, when the thickness of the V-shaped antenna element 4 ranges from 350 nm to 400 nm, the intensity of the output light 20 has a value within an even higher range.

In the metasurface 1, as the thickness of the V-shaped antenna element 4 increases in manufacturing, it is difficult to provide the V-shaped antenna elements 4 on the GaAs substrate 2. There are actual situations in which, when the thickness of the V-shaped antenna element 4 is greater than 400 nm, it is impractical to provide the V-shaped antenna elements 4 on the GaAs substrate 2 and in which, when the thickness of the V-shaped antenna element 4 is greater than 500 nm, it is very impractical to provide the V-shaped antenna elements 4 on the GaAs substrate 2. Therefore, in the metasurface 1, the V-shaped antenna element 4 has the thickness in a range of 30 nm to 500 nm. When the thickness of the V-shaped antenna element 4 is 370 nm, the intensity of the output light 20 can be increased about 9,400-fold with respect to when the interlayer 3 is not provided and the thickness of the V-shaped antenna elements 4 is 30 nm.

FIGS. 13A to 13D are schematic perspective views illustrating fifth to eighth antenna elements 45A to 48A according to a modification. FIG. 14 is a view for defining a shape of a V-shaped antenna element 4A having an inverse symmetric structure in accordance with the modification. In FIGS. 13 and 14, the unit cell C is illustrated. As illustrated in FIG. 13, a plurality of V-shaped antenna elements 4A may include fifth to eighth antenna elements 45A to 48A that are V-shaped structures, that is, inverse symmetric structures in which first to fourth antenna elements 41 to 44 are inverted with respect to the Y axis, instead of the fifth to eighth antenna elements 45 to 48 (see FIG. 3).

As illustrated in FIG. 14, the V-shaped antenna element 4A having an inverse symmetric structure according to the modification has a structure in which the basic structure of FIG. 4A is inverted with respect to the Y axis. In the unit cell C for the V-shaped antenna element 4A, an axis s3 of symmetry perpendicular to the axis s1 of symmetry (see FIG. 4A) and an axis a3 of asymmetry perpendicular to the axis s3 of symmetry are set. The axis s3 of symmetry has an angle α with respect to the Y axis. The V-shaped antenna element 4A having an inverse symmetric structure according to the modification presents a line symmetrical shape via the axis s3 of symmetry.

Figure 13A:
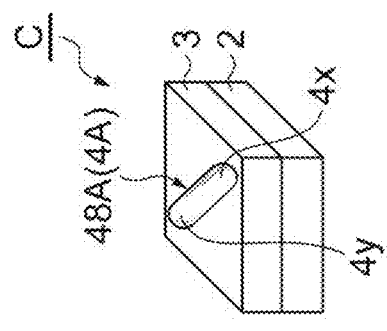
FIG. 13A is a schematic perspective view illustrating a fifth antenna element according to a modification.
Figure 13B:
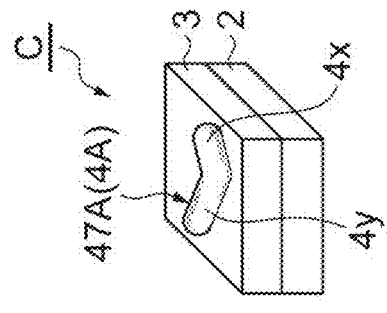
FIG. 13B is a schematic perspective view illustrating a sixth antenna element according to the modification.
Figure 13C:
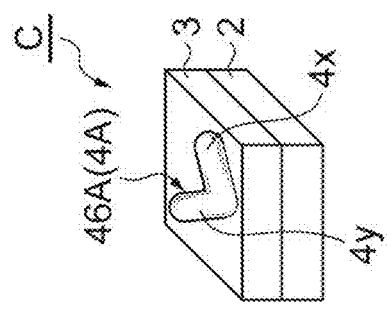
FIG. 13C is a schematic perspective view illustrating a seventh antenna element according to the modification.
Figure 13D:
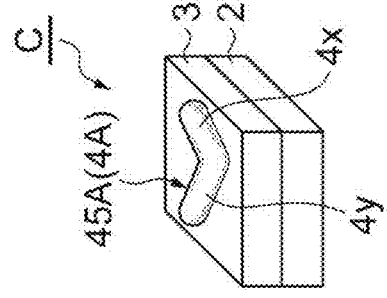
FIG. 13D is a schematic perspective view illustrating an eighth antenna element according to the modification.
Figure 14:
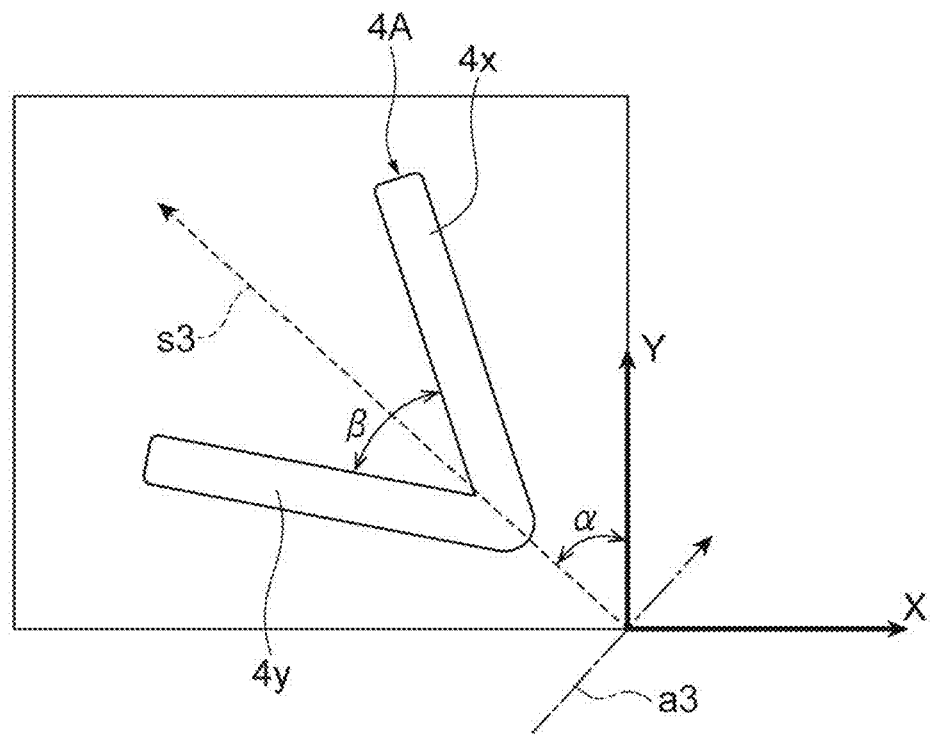
FIG. 14 is a view for defining a shape of the V-shaped antenna element having an inverse symmetric structure in accordance with the modification.

As illustrated in FIG. 13A, the fifth antenna element 45A has an inverse symmetric structure of the first antenna element 41 with respect to the Y axis. An inter-arm angle β of the fifth antenna element 45A is 75 degrees. As illustrated in FIG. 13B, the sixth antenna element 46A has an inverse symmetric structure of the second antenna element 42 with respect to the Y axis. An inter-arm angle β of the sixth antenna element 46A is 90 degrees. As illustrated in FIG. 13C, the seventh antenna element 47A has an inverse symmetric structure of the third antenna element 43 with respect to the Y axis. An inter-arm angle β of the seventh antenna element 47A is 120 degrees. As illustrated in FIG. 13D, the eighth antenna element 48A has an inverse symmetric structure of the fourth antenna element 44 with respect to the Y axis. An inter-arm angle β of the eighth antenna element 48A is 180 degrees. That is, the eighth antenna element 48 has a shape in which the first arm 4x and the second arm 4y extend straight along the same straight line.

The plurality of V-shaped antenna elements 4 including the fifth to eighth antenna elements 45A to 48A instead of the fifth to eighth antenna elements 45 to 48 are configured to be usable as phase modulation optical devices. That is, the first to fourth antenna elements 41 to 44 and the fifth to eighth antenna elements 45A to 48A are identical in the intensity of the output light 20 that is output depending on the input of the input light 10. The first to fourth antenna elements 41 to 44 and the fifth to eighth antenna elements 45A to 48A perform the phase modulation of 0 to 2π on the input light 10.

FIG. 15 is a schematic perspective view illustrating V-shaped antenna elements 4B according to a modification. FIGS. 15A to 15H illustrate first to eighth antenna elements 41B to 48B according to the modification. The metasurface 1 may include the plurality of V-shaped antenna elements 4B illustrated in FIG. 15 instead of the plurality of V-shaped antenna elements 4 (see FIG. 3).

The V-shaped antenna elements 4B are so-called negative type elements. The V-shaped antenna elements 4B are concaves formed in metal layers 8 disposed on the interlayer 3. The V-shaped antenna elements 4B are provided to be recessed in the metal layers 8 disposed on the surface of the interlayer 3 which is opposite to the GaAs substrate 2 side via the adhesive layer 5 in the Z-axial direction. The metal layers 8 are formed of a metal such as gold (Au). The each of the V-shaped antenna elements 4 may have a depth (a dimension in the Z direction) in a range of 30 nm to 500 nm. Each of the V-shaped antenna elements 4 has a groove-like first arm 4Bx and a groove-like second arm 4By continuous with one end of the first arm 4Bx.

The plurality of V-shaped antenna elements 4B include eight types of first to eighth antenna elements 41B to 48B in which shapes of V-shaped structures thereof are different from one another. The first to eighth antenna elements 41B to 48B are formed in the metal layers 8, and are concaves having the same shapes as the convexes of the first antenna elements 41 to 48.

Figure 15A:
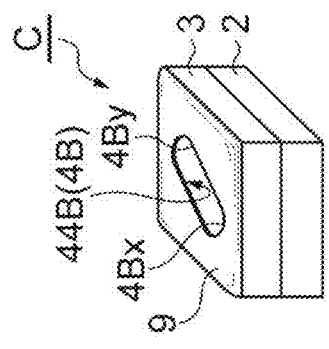
FIG. 15A is a schematic perspective view illustrating a first antenna element according to the modification.
Figure 15B:
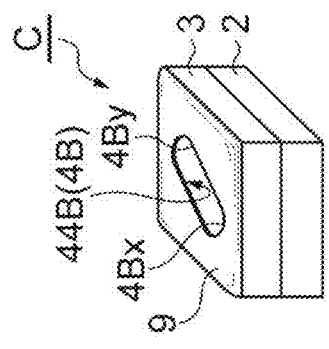
FIG. 15B is a schematic perspective view illustrating a second antenna element according to the modification.
Figure 15C:
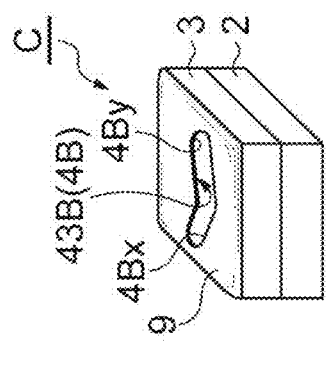
FIG. 15C is a schematic perspective view illustrating a third antenna element according to the modification.
Figure 15D:
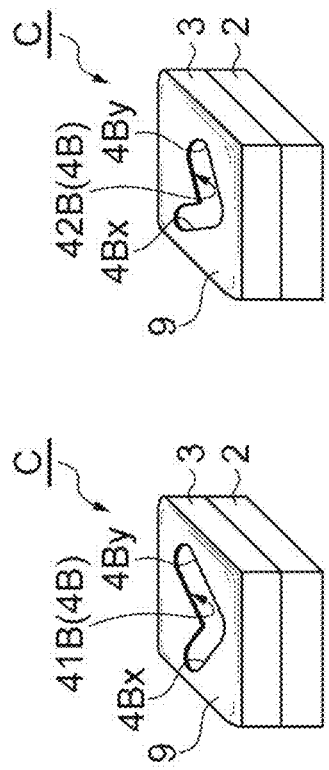
FIG. 15D is a schematic perspective view illustrating a fourth antenna element according to the modification.

To be specific, as illustrated in FIG. 15A, an inter-arm angle β of the first antenna element 41B is 75 degrees. As illustrated in FIG. 15B, an inter-arm angle β of the second antenna element 42B is 90 degrees. As illustrated in FIG. 15C, an inter-arm angle β of the third antenna element 43B is 120 degrees. As illustrated in FIG. 15D, an inter-arm angle β of the fourth antenna element 44B is 180 degrees. That is, the fourth antenna element 44B has a shape in which the first arm 4Bx and the second arm 4By extend straight along the same straight line.

Figure 15E:
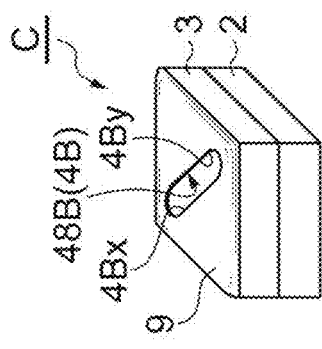
FIG. 15E is a schematic perspective view illustrating a fifth antenna element according to the modification.
Figure 15F:
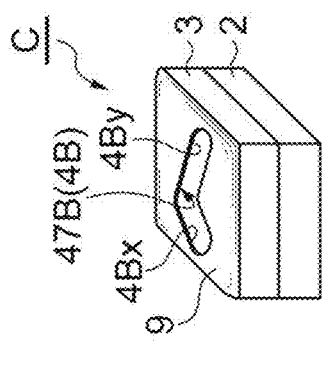
FIG. 15F is a schematic perspective view illustrating a sixth antenna element according to the modification.
Figure 15G:
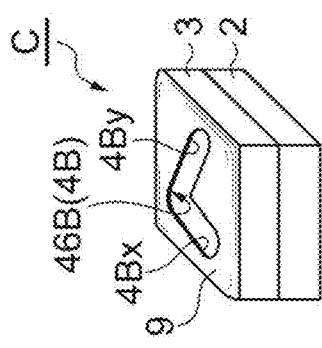
FIG. 15G is a schematic perspective view illustrating a seventh antenna element according to the modification.
Figure 15H:
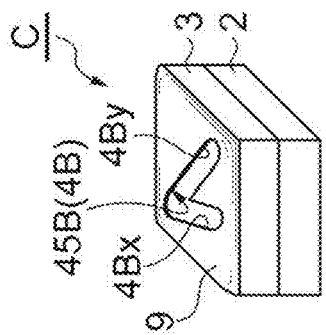
FIG. 15H is a schematic perspective view illustrating an eighth antenna element according to the modification.

As illustrated in FIG. 15E, the fifth antenna element 45B has an inverse symmetric structure of the first antenna element 41B with respect to the X axis. An inter-arm angle β of the fifth antenna element 45B is 75 degrees. As illustrated in FIG. 15F, the sixth antenna element 46B has an inverse symmetric structure of the second antenna element 42B with respect to the X axis. An inter-arm angle β of the sixth antenna element 46B is 90 degrees. As illustrated in FIG. 15G, the seventh antenna element 47B has an inverse symmetric structure of the third antenna element 43B with respect to the X axis. An inter-arm angle β of the seventh antenna element 47B is 120 degrees. As illustrated in FIG. 15H, the eighth antenna element 48B has an inverse symmetric structure of the fourth antenna element 44B with respect to the X axis. An inter-arm angle β of the eighth antenna element 48B is 180 degrees. That is, the eighth antenna element 48B has a shape in which the first arm 4Bx and the second arm 4By extend straight along the same straight line.

This plurality of V-shaped antenna elements 4B are configured to be usable as the phase modulation optical devices. That is, the first to eighth antenna elements 41B to 48B are identical in the intensity of the output light 20 that is output depending on the input of the input light 10. The first to eighth antenna elements 41B to 48B perform the phase modulation of 0 to 2π on the input light 10.

In the metasurface 1, the each of the plurality of V-shaped antenna elements 4B is concave formed in the metal layers 8 disposed on the interlayer 3. Therefore, in the metasurface 1 having the V-shaped antenna elements 4B formed as the so-called negative type elements, the conversion efficiency of light caused by the V-shaped antenna elements 4 can be improved.

Figure 16:
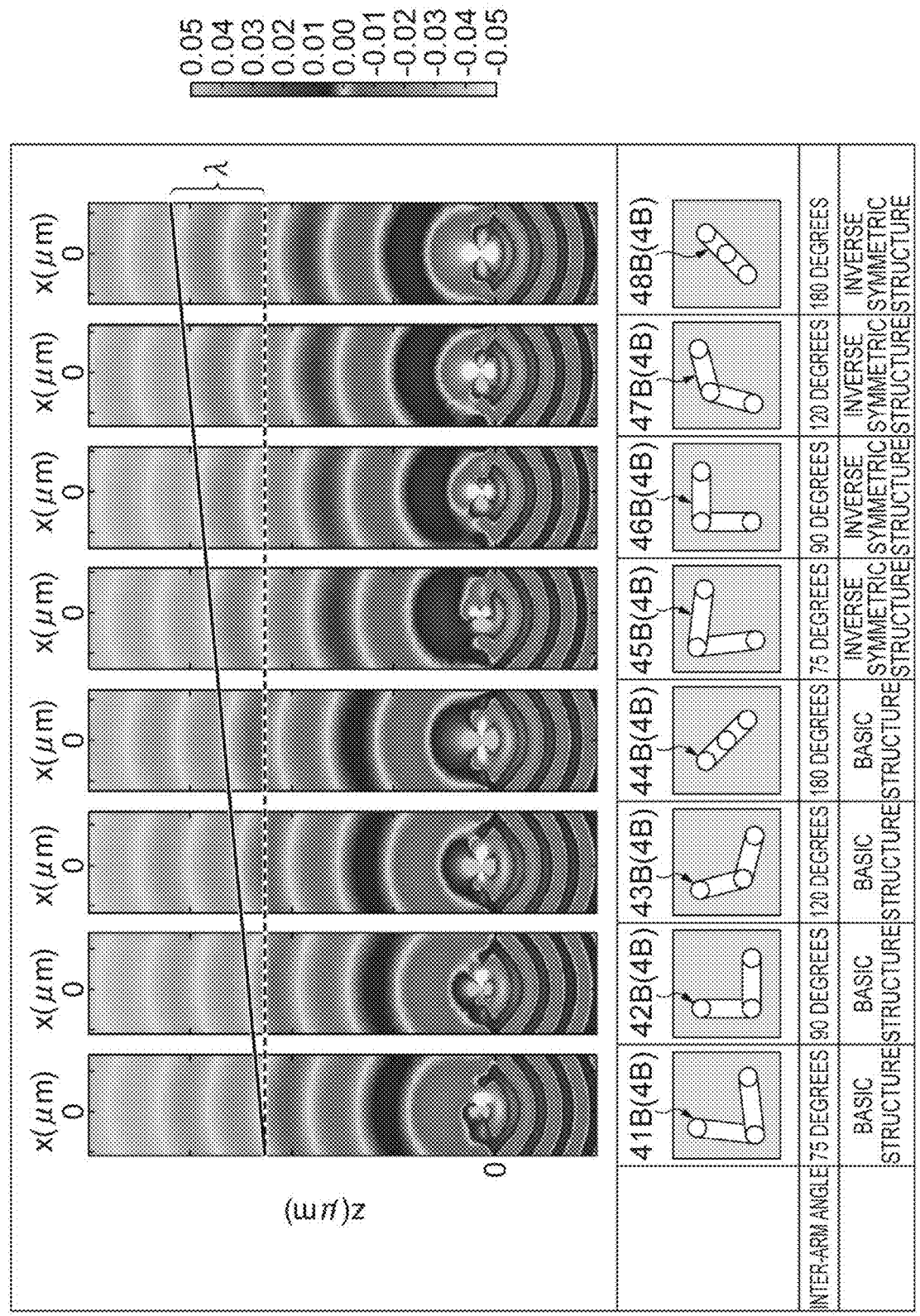
FIG. 16 is a diagram illustrating results of analyzing development of electric fields caused by the first to eighth antenna elements according to the modification.

FIG. 16 is a diagram illustrating results of analyzing development of electric fields caused by the first to eighth antenna elements 41B to 48B according to the modification. Here, for the analysis, the unit cell C is set as a target of analysis, the thickness of the interlayer 3 is set to 118 nm, the thickness of the V-shaped antenna elements 4 is set to 30 nm, and the thickness of the adhesive layer is set to 5 nm. The input light 10 is set as light that is orthogonally input from the light input surface 2a of the GaAs substrate 2. In the phase development diagrams in the figure, a domain in which the Z axis is equal to or less than 0 indicates the GaAs substrate 2 side rather than the V-shaped antenna elements 4, and a domain in which the Z axis is greater than 0 indicates an atmosphere side. Each of the phase development diagrams in the figure shows phase development of the electric field caused by the V-shaped antenna element 4 shown therebelow.

In the example shown in FIG. 16, the electric fields of the output light 20 caused by the first to eighth antenna elements 41B to 48B are developed in that order. It is found that the electric field of the output light 20 caused by the eighth antenna element 48 is developed by λ (one wavelength) with respect to the electric field caused by the first antenna element 41B. Thereby, it can be confirmed that the phase modulation of 0 to 2π is performed by use of the first to eighth antenna elements 41B to 48B.

Figure 17:
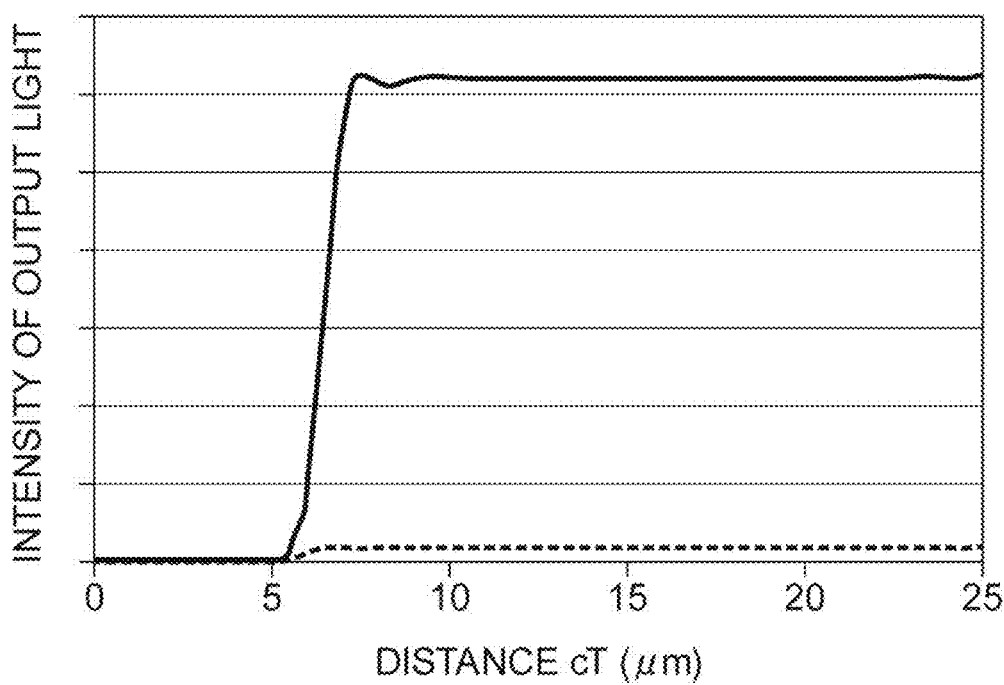
FIG. 17 is a graph illustrating results of analyzing a difference in the intensity of the output light due to presence or absence of the interlayer.

FIG. 17 is a graph illustrating results of analyzing a difference in the intensity of the output light 20 due to presence or absence of the interlayer 3 of the metasurface 1 according to the modification. Here, for the analysis, a transmission monitor is disposed at a position spaced 4 μm away from the V-shaped antenna element 4B, and a change in time of the output light 20 is analyzed by the FDTD method in each of a second example and a second comparative example. The longitudinal axis in the figure indicates the intensity of the output light 20. The transverse axis in the figure is cT that is a value obtained by multiplying the velocity of light c by a calculation time step T determined according to coolant conditions. The second example is the metasurface 1 according to the modification (that is, the metasurface 1 having the negative type V-shaped antenna elements 4B). The second comparative example is the metasurface 1 without the interlayer 3. A solid line in the figure shows results according to the second example, and a broken line in the figure shows results according to the second comparative example.

As illustrated in FIG. 17, the interlayer 3 is also provided for the metasurface 1 having the negative type V-shaped antenna elements 4B. Thereby, it can be confirmed that the intensity of the output light 20 is greatly increased. To be specific, with respect to a case in which the interlayer 3 is not provided, it can be confirmed that the intensity of the output light 20 is increased about 36-fold.

While the embodiment has been described, the present invention(s) is not limited to the above embodiment, and may be modified without changing the gist described in each claim or be applied to other embodiments. For example, an error in designing, measuring or manufacturing is included in each of the above numerical values.

According to one embodiment, in the metasurface capable of modulating the input light including a wavelength in a range of 880 nm to 40 μm, the conversion efficiency of light caused by the V-shaped antenna elements can be improved.

What is claimed is:

1. A metasurface capable of modulating an input light including a wavelength in a range of 880 nm to 40 μm, the metasurface comprising:
    a GaAs substrate including a light input surface into which input light is input and a light output surface facing the light input surface;
    an interlayer having a lower refractive index than GaAs and disposed on the light output surface side of the GaAs substrate; and
    a plurality of V-shaped antenna elements disposed on a side of the interlayer which is opposite to the GaAs substrate side and including a first arm and a second arm continuous with one end of the first arm.

2. The metasurface according to claim 1, wherein the interlayer has a thickness in a range of 60 nm to 5 μm.

3. The metasurface according to claim 2, wherein the interlayer is a SiN layer, a $TiO_2$ layer, or a $HfO_2$ layer.

4. The metasurface according to claim 3, wherein the each of the V-shaped antenna elements has a thickness in a range of 30 nm to 500 nm.

5. The metasurface according to claim 4, wherein the each of plurality of V-shaped antenna elements has an angle formed by the first and second arms in a range of 70 degrees to 180 degrees.

6. The metasurface according to claim 3, wherein the each of plurality of V-shaped antenna elements has an angle formed by the first and second arms in a range of 70 degrees to 180 degrees.

7. The metasurface according to claim 2, wherein the each of the V-shaped antenna elements has a thickness in a range of 30 nm to 500 nm.

8. The metasurface according to claim 7, wherein the each of plurality of V-shaped antenna elements has an angle formed by the first and second arms in a range of 70 degrees to 180 degrees.

9. The metasurface according to claim 2, wherein the each of plurality of V-shaped antenna elements has an angle formed by the first and second arms in a range of 70 degrees to 180 degrees.

10. The metasurface according to claim 1, wherein the interlayer is a SiN layer, a $TiO_2$ layer, or a $HfO_2$ layer.

11. The metasurface according to claim 10, wherein the each of the V-shaped antenna elements has a thickness in a range of 30 nm to 500 nm.

12. The metasurface according to claim 11, wherein the each of plurality of V-shaped antenna elements has an angle formed by the first and second arms in a range of 70 degrees to 180 degrees.

13. The metasurface according to claim 10, wherein the each of plurality of V-shaped antenna elements has an angle formed by the first and second arms in a range of 70 degrees to 180 degrees.

14. The metasurface according to claim 1, wherein the each of the V-shaped antenna elements has a thickness in a range of 30 nm to 500 nm.

15. The metasurface according to claim 14, wherein the each of plurality of V-shaped antenna elements has an angle formed by the first and second arms in a range of 70 degrees to 180 degrees.

16. The metasurface according to claim 1, wherein the each of plurality of V-shaped antenna elements has an angle formed by the first and second arms in a range of 70 degrees to 180 degrees.

17. The metasurface according to claim 1, wherein the each of the plurality of V-shaped antenna elements is convex disposed on the interlayer.

18. The metasurface according to claim 1, wherein the each of the plurality of V-shaped antenna elements is concave formed in metal layers disposed on the interlayer.

\* \* \* \* \*